United States Patent [19]

Catros et al.

[11] Patent Number: 4,843,630
[45] Date of Patent: Jun. 27, 1989

[54] METHOD OF BRIDGING BETWEEN CONTOUR ELEMENTS IN AN IMAGE

[75] Inventors: Jean Yves Catros, Rennes; Francois Malo-Renault, Cesson Sevigne, both of France

[73] Assignee: Thomson -CGR, Paris, France

[21] Appl. No.: 933,922

[22] Filed: Nov. 24, 1986

[30] Foreign Application Priority Data

Nov. 26, 1985 [FR] France ............................... 85 17476

[51] Int. Cl.[4] .................... G06F 15/70; A61B 1/04; G06K 9/48
[52] U.S. Cl. ........................................ 382/6; 382/22; 358/96
[58] Field of Search .................. 364/414; 358/111, 96, 358/160; 382/6, 22

[56] References Cited

U.S. PATENT DOCUMENTS

| | | | |
|---|---|---|---|
| 4,101,961 | 7/1978 | Reiber | 358/111 X |
| 4,538,227 | 8/1985 | Toraichi et al. | 364/414 |
| 4,627,096 | 12/1986 | Grattoni et al. | 382/8 |

OTHER PUBLICATIONS

Grattoni, P. et al., "Contour Detection of the Left Ventricular Cavity from Angiographic Images", IEEE Transactions on Medical Imaging, vol. MI-4, No. 2 Jun. 1985, pp. 72-78, esp. pp. 73-75, paragraph Heuristic boundary Follower.
Persoon, E. "A New Edge Detection Algorithm and its Applications in Picture Processing", Computer Graphics and Image Processing, vol. 5, No. 4, Dec. 1976, 425-446.
Ashkar, G. P. et al., "The Contour Extraction Problem with Biomedical Applications", IEEE Proceedings of the Conference on Pattern Recognition and Image Processing Jun. 6-8, 1977, New York, pp. 216-224.
Juvin, D. et al., "Anima (Analysis of Images)-A Quasi Real Time System", Proceedings of the IEEE Computer Society Conference Pattern Recognition and Image Processing, Jun. 14-17, 1982, Las Vegas, Nevada, pp. 358-361.

*Primary Examiner*—Clark A. Jablon
*Attorney, Agent, or Firm*—Cushman, Darby & Cushman

[57] ABSTRACT

A method is provided for bridging between disjointed contour elements in an image by searching for an optimum bridging path between the facing ends of disjointed contour elements in the image. The method of the steps of defining a search window between each of the facing ends of the disjointed controur elements, considering in the window the different image points as nodes on a graph, determining an elementary cost associated with each path connecting each node to its neighboring nodes from amplitude and/or orientation data of the luminance function used for detecting the contours and in determining the optimum path by following, from the costs obtained, a line for which the luminance gradient of the detected points appears to be a maximum.

7 Claims, 2 Drawing Sheets

METHOD OF BRIDGING BETWEEN CONTOUR ELEMENTS IN AN IMAGE

BACKGROUND OF THE INVENTION

The present invention relates to a method or process of bridging between contour elements in an image. It applies more particularly to the recognition of vessels in digital angiography but may also apply to the analysis of aerial views for the recognition of rivers and roads.

Angiography is a process permitting visual analysis of blood vessels. It principally consists in X-raying the zone of observation before then after injection of a product opaque to the X-rays. The logarithmic difference of these two images, if there is no movement between the two images, allows a well contrasted image to be obtained of the zones of the vascular network where theproduct has diffused. The support for the image is formed, in digital angiography, by a digital image memory allowing the observed zones of the vascular network to be analysed practically in real time. Only the contour lines of the vascular network are restored discontinuously because of the thresholds used in the contour extraction methods. It is consequently necessary to determine whether these discontinuities are due to a real absence of contours or if, on the contrary, they are caused by a local minimum of the luminance gradient.

Known processes are generally based on considerations of proximity or orientation at the ends of the contour lines likely to be bridged, but these processes are still imprecise and give no information with sufficient certainty about the real presence or absence of discontinuities in the vascular network.

SUMMARY OF THE INVENTION

The aim of the invention is to overcome the above drawbacks.

For this, the invention provides a method of bridging between disjointed contour elements in an image by searching for an optimum bridging path between the facing ends of the disjointed contour elements. The method consists of the steps of defining a search window between each of the facing ends of the disjointed contour elements, considering in the window the different image points as nodes on a graph, determining the elementary cost associated with each path connecting each node to its adjacent nodes from amplitude and orientation information of the luminance function used for detecting the contours, and determining the optimum path by following, from the costs obtained, a line for which the luminance gradient of the detected points appears to be a maximum.

The invention has the principle advantage that it allows at the same time a factor of confidence to be associated with each bridging effected and favors a particular form of path by adjusting the cost functions associated with each arc of the graph.

BRIEF DESCRIPTION OF THE DRAWINGS

Other features and advantages of the invention will appear from the following description with reference to the accompanying drawings in which.

DESCRIPTION OF THE PREFERRED EMBODIMENT

In digital image formation, the methods of detecting contours generally comprise two main processing phases, one consisting in defining, from a digital image in which each image point is coded over 8 bits, for example, another image more characteristic of the desired contours from a filtering procedure, the other consisting in adopting thresholds for the image obtained and effecting binary operations on the image thus thresholded for detecting the associated zones, thinning them down and obtaining segments by linear approximation of the contours.

However, the contours thus obtained and stored in digital image memory have discontinuities and it may be desirable to fill these in when the real contour data is missing or non-existent. To fill in a discontinuity, bridging may, for example, be provided directly on the binary image stored in the memory by taking into consideration certain criteria such as the length thereof and/or the angles formed by the direction of the contour lines situated on each side thereof.

The drawback of these methods is that they carry out processing on reduced binary data, and much information is lost which would be useful for helping in making a correct decision.

Another method described in an article of the CGIPI on pages 169 to 182, published in 1972 and entitled "Martelli Edge Detection Using Heuristic Search Methods", is based on a heuristic procedure of searching for paths in a luminance image, and the method allows contours to be detected in given image zones. The bridging method of the present invention takes up again certain principles of the method described in this article. However, the present invention is essentially distinguished therefrom because of its adaptation to the specific bridging problem of the invention and by the fact that it uses as starting data that data representing the grey levels of the image of the amplitudes and/or orientations of the gradients which are already calculated for elaborating the image of the contours. This data better represents the contours than the initial luminance data. The present invention also uses a search algorithm known under the name of Moore-Dijkstra algorithm which seems better adapted for providing a solution to one of the specific problems raised by the invention, this method consisting of searching for the existence of a contour passing through two points A and B, bringing this problem down to that already solved by this algorithm and for finding the shortest path in a graph between two tops.

Figure 1:
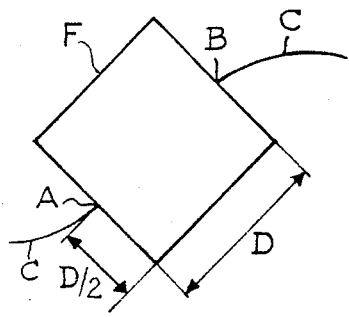
FIG. 1 shows a research window defined from two ends of a contour to be bridged.
Figure 2A:
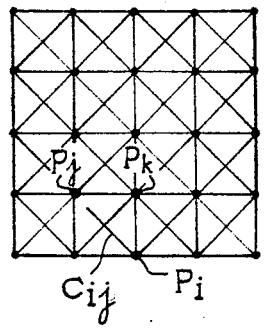
FIGS. 2a and 2b show graphs formed of image points disposed inside the search windows.
Figure 2B:
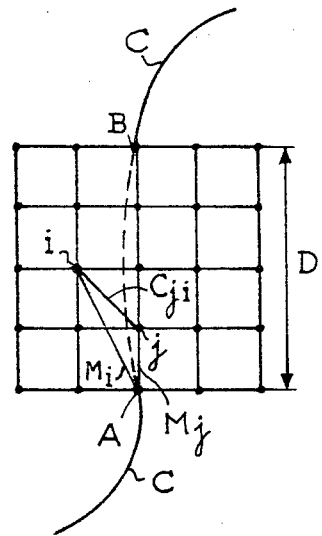

According to the invention, if the coding cost of the shortest path is less than a given threshold, this path is considered as the corresponding to the desired bridging, if not, there is no bridging possible between the two points. The search space in the image memory is defined in the way shown in FIG. 1, where there is inserted between two points A and B, marking the ends of a discontinuity in a contour C of the image, a square of side D equal to the distance separating the two points A and B and oriented in the plane so that points A and B are disposed on two opposite sides of the square in the middle thereof. The search space F thus defined forms a search window which is intersected in FIG. 2A by lines and columns, each node placed at the intersection of a line and a column representing an image point. In FIG. 2A, the square search window is divided into three lines and three columns, and each node $P_i$ inside the search window F is connected to each of its eight neighbors $P_j$ by an arc (i,j) to which is assigned a cost $M_i = C_{ij}$ corresponding to the cost associated with the passage from a point $P_i$ to an adjacent point $P_j$. Thus, by defining the characteristic costs for each arc subtended between two adjacent nodes, an overall cost may be calculated for determining the shortest path for going from point A to point B.

Figure 3:
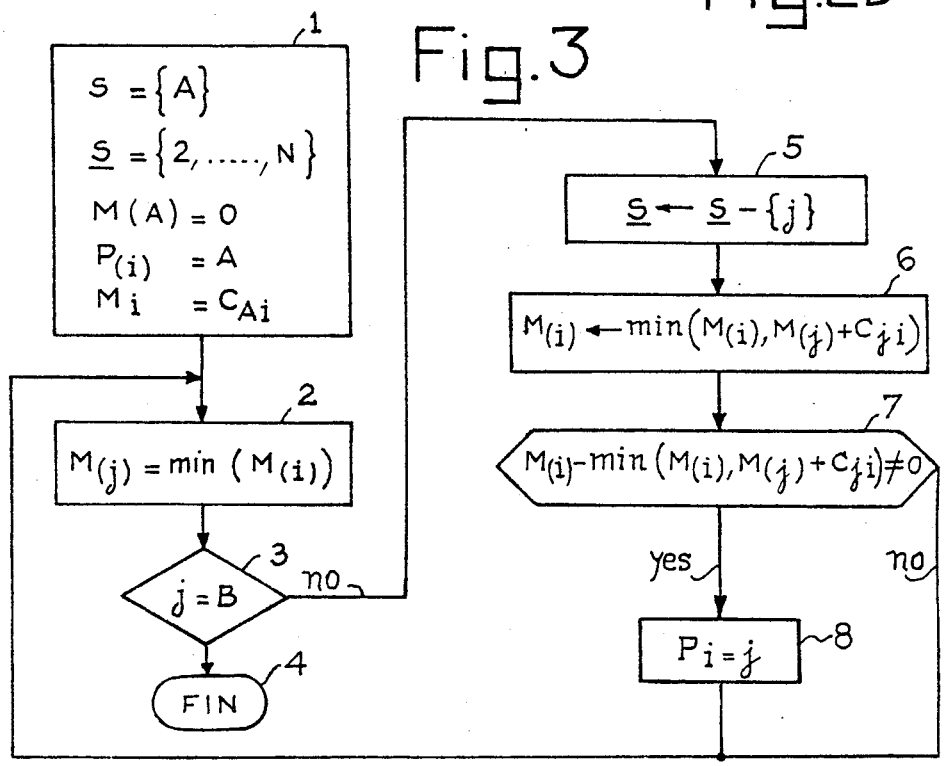
FIG. 3 shows a flow chart retracing the steps of the method used by the invention for calculating an optimum path between points of the graph to be bridged.

Searching for the shortest path is effected by applying the teaching of the "Moore Dijkstra" algorithm in the way described hereafter with reference to the flow chart in FIG. 3, as applied to a graph represented by an assembly of apices (A, 2, ..., N) and an assembly of arcs (i,j) to which a cost $C_{ij}$ is assigned. The execution of this algorithm begins by an initialization phase and continues with a phase for selecting the points of the graph of minimum cost, followed by a phase for updating the costs for each minimum cost point selected inside the graph. The initialization phase shown at 1 in FIG. 3 causes the search to start at apex $S = A$ by considering also the assembly $S = (2, ..., N)$ of the pixels or remaining image points of the window.

In FIG. 3 $M(A) = 0$ designates the cost associated with the starting point A, $M_i = C_{Ai}$ designates the coding cost for travelling over the path separating point A from a point i adjacent point A and $P_{(i)}$ a vector which is formed at each selected point of the optimum path for reconstituting this path when all the steps of the algorithm are finished. During the initialization phase, the vector $P_{(i)}$ (predecessor of i) is placed equal to $P_{(A)}$ for designating the starting apex A.

The phase for selecting the minimum costs is carried out in steps 2 to 5. Step 2 consists in choosing the apex j belonging to the assembly S so that the cost M(j) is equal to the minimum of the costs (M(i)) whatever the apex i belong to the assembly S. If the minimum of the costs obtained reveals that the minimum cost apex j corresponds to the apex B (step 3), the procedure stops at step 4 and the minimum cost path is obtained from the vector $P_{(i)}$. On the other hand, if the minimum cost apex j does not correspond to apex B, the procedure continues to step 5 by updating the whole of the apices S by removing the apex j from this assembly and updating the costs in step 6, the starting cost $M_i$ being updated possibly by a cost $M_j + C_{ji}$ equal to the cost of point j increased by the cost $C_{ji}$ of the path connecting the preceding point i to point j. Since this updating corresponds to the notation in FIG. 3, $M_{(i)} \leftarrow \min (M_{(i)}, M_{(j)} + C_{ji})$, allows a test to be carried out in step 7 on the new cost obtained, and if the new cost obtained is different from the preceding cost $M_{(i)}$, then the vector $P_i$ is updated for designating in step 8 the apex j as predecessor of apex i. If not, the processing returns to the execution of step 2.

The elementary costs $C_{ij}$ depend on the gradient extraction method selected as well as on the constraints imposed on the shape of the path. In the preferred embodiment of the invention, the gradient extraction method used is derived from that which is proposed in the article by NEVATA and BABU entitled "Linear picture edges extraction and description" published in volume no. 13 of 1980 in the "Review of Computer Graphics and Images Processing". This method uses several different masks by characterizing each contour element by an amplitude and a local orientation thereof. It gives good results for the specific problems of digital angiography. However, other methods of extracting contours giving an image with a grey level characteristic of these contours could also be applied to the bridging method of the invention which has just been described.

The elementary costs $C_{ij}$ may then also depend on the constraints which may be imposed on the shape of the path. For example, in a first case, if it is desired to follow the line of maximum amplitude of the gradient so as to determine the shape of the path, elementary costs of the type $c_{ij} = \text{Max} - a_j$ may be determined, where $C_{ij}$ designates the elementary cost for going from apex i to apex j;

Max designates the maximum amplitude of the gradient in window F; and $a_j$ designates the amplitude of the gradient at apex j.

In a second case, so as to take into account more particularly the shape of the path, it may be profitable to use the local orientation data so that the desired shape of the path intervenes in the cost. For example, for favoring a rectilinear path, elementary costs of the type:

$$C_{ij} = \text{Max} - a_j + K_1 \cdot |\theta_J - \theta \text{mean}|$$

or $C_{ij} = \text{Max} - a_j/(K_2 \cdot Q)$ may be used with $Q = 1/K_2$ if $\theta_j = \theta$ mean or $Q = |\theta_j - \theta \text{ mean}|$ if $\theta_j$ is different from mean $\theta$ mean. In these formulae $\theta_j$ designates the local orientation at apex j and mean $\theta$ designates the mean of the local orientation at apices A and B.

Similarly, for defining a regular contour, without a sudden change of orientation (i.e., the local orientation varies progressively), an elementary cost of the type:

$$C_{ij} = \text{Max} - a_j + K_1 \cdot |\theta_j - \theta_i|$$

or else $$C_{ij} = \text{Max} - a_i/(K_2 \cdot Q)$$

may be used with $Q = 1/K_2$ if $\theta_j = Q_i$ or else $Q = |\theta_i - \theta_j|$ if $\theta_j$ is different from $\theta_i$.

Once the optimum path has been found, it must then be decided whether its character is acceptable or not. A first method consists in only selecting the path if the cost with respect to the number of points of the path is less than a predetermined threshold. This method is valid but determination of the threshold remains delicate. It seems much preferable to calculate along a path L a relative criterion of quality of the form:

$$C_r = \sum_L \frac{A_i \times N^{-1}}{a_{max}}$$

where $A_i$ = the amplitude of the gradient at the point i of the path corrected by the orientation: $(\text{Max} - C_{ij})$;

N = the number of points on the path;

$a_{max}$ = maximum amplitude on the path, including end points.

Thus the bridging will only be effected if $C_r$ is greater than a given threshold expressed by a percentage.

Figure 4:
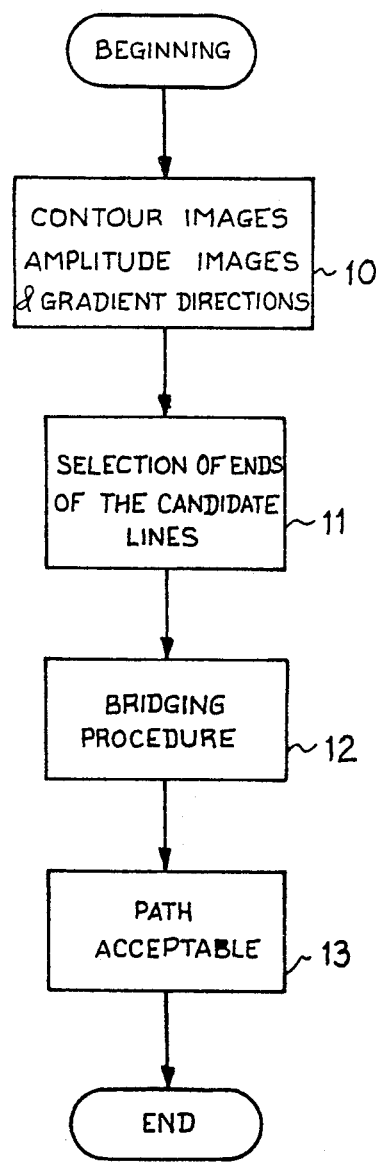
FIG. 4 shows one example of applying the bridging method of the invention.

The example which has just been given of the preferred embodiment of the invention is not limitative, for other variants are also possible which will depend for the most part on the approach used for defining the system for processing the image without them departing from the scope of the invention claimed. In the case, for example, of an approach with the aim of extracting the maximum of data from the image without taking into account the results of the high level processing steps, it may be desirable to bridge all the ends of the contour lines which satisfy certain criteria of proximity. A corresponding algorithm may in this case by of the type shown in FIG. 4 in steps 10 to 13, beginning at step 10 by collecting the initial data forming the images of the contours, the amplitudes and the directions of the gradient, for selecting in step 11, the ends of the candidate contour lines if these distances are less than a threshold and if they have a closely related orientation. In this case, the bridging method which has just been described may be applied to the selected ends at step 12, and if the test of accessibility is verified the bridge obtained will be selected or rejected in the opposite case at step 13. It will be noted that this strategy may be further used in two different ways, either such as it is or else iteratively. In this latter case, the holes will be stopped up first of all with one point, then two points, etc... The most interesting method will depend on the type of image and on the time available.

Other approaches may also be directed not from data but from a concept of the type known as "Top. Down", for example. In fact, the formulation of a hypothesis about the existence of an object may lead to forming a hypothesis about the continuity of a contour. This continuity may consequently be verified by the bridging process which has just been described so as to confirm or invalidate the hypothesis. In this case it will be sufficient to simply apply the method of the invention to the ends designated A and B and not to the whole image as in the preceding approach.

What is claimed is:

1. A digital processing method for bridging facing ends of disjointed contour elements in an image defined by pixel elements having intensity values stored in a digital image memory, comprising the steps of:

defining a search window in a portion of the digital image memory defining points between each of the facing ends of the disjointed contour elements;

intersecting said points in the portion of the digital image memory defining the search window by lines and columns so as to form a graph for measuring a luminance gradient of the pixel element intensity values stored in the portion of the digital image memory defining points located at crossing points of the lines and columns inside the search window;

forming in the portion of the digital image memory defining said search window an elementary path connecting each crossing point to each of its neighboring crossing points;

computing an elementary coding cost for each elementary path between neighboring crossing points depending on the luminance gradient of the points located in the portion of the digital image memory defining the search window;

computing an optimum path for linking the facing ends of the disjointed contour elements by following, from one end of one contour element, a line linking all elementary paths having a minimum coding cost, and storing the optimum path in the portion of the digital image memory defining said points between facing ends of the digital contour elements.

2. A digital processing method as claimed in claim 1, wherein each elementary coding cost $C_{ij}$ computed in said elementary coding cost computing step for going from one crossing point i to a neighboring crossing point j is defined by a relationship $$C_{ij} = \text{Max} - a_j,$$

where Max designates a maximum amplitude of the luminance gradient in the portion of the digital image memory defining the search window, and $a_j$ designates an amplitude of the luminance gradient at crossing point j.

3. A digital processing method as claimed in claim 2, wherein the optimum path computed in said optimum path computing step is determined as a function of the local orientation of the elementary path found at each crossing point j of the graph for causing a shape of a desired path to intervene in the value of the elementary coding cost for each elementary path between neighboring crossing points.

4. A digital processing method as claimed in claim 3, wherein the desired path is a rectilinear path and each elementary coding cost $C_{ij}$ is defined by a relationship equal to one of $$C_{ij} = \text{Max} - a_j + K_1 \cdot |\theta_j - \theta_{mean}|$$

and $$C_{ij} = \text{Max} - a_j/(K_2 \cdot Q)$$

where $K_1$ and $K_2$ are constants, $Q = |\theta_j - \theta_{mean}|$ if $\theta_j \neq \theta_{mean}$ or $Q = 1/K_2$ if $\theta_j = \theta_{mean}$ and $\theta_j$ and $\theta_{mean}$ designate respectively the local orientation at crossing point j and the mean of the local orientations at said facing ends.

5. A digital processing method as claimed in claim 3, wherein the desired path has a local orientation which varies progressively, and each elementary coding cost $C_{ij}$ is defined by a relationship $$C_{ij} = \text{Max} - a_j/K_2 \cdot Q,$$

where $K_2$ is a constant, $Q = |\theta_j - \theta_i|$ if $\theta_j \neq \theta_i$ and $Q = 1/K_2$ if $\theta_j = \theta_i$ and $\theta_j$ and $\theta_i$ designate respectively the local orientation at crossing points j and i.

6. A digital processing method as claimed in claim 3, comprising the further step of calculating along the optimum path computed in said optimum path computing step a criterion of quality $C_r$ defined by the relationship $$C_r = \sum_L \frac{A_i \cdot N^{-1}}{a_{max}},$$

where $A_i$ = the amplitude corrected by the orientation $A_i = \text{Max} - C_{ij}$ of the luminance gradient at crossing point i of the path, N = the number of crossing points on the optimum path and $a_{max}$ = the maximum amplitude of the luminance gradient on the optimum path, whereby bridging is effected if $C_r$ is greater than a predetermined threshold.

7. A digital processing method as claimed in claim 1, comprising the further step of selecting an optimum path computed in said optimum path computing step if the total coding cost of said line linking all elementary paths having a minimum coding cost with respect to the number of crossing points in the optimum path is less than a predetermined threshold.

* * * * *